May 12, 1953      R. A. CRUMBLISS      2,638,495
TESTING APPARATUS
Filed April 26, 1951            3 Sheets-Sheet 1
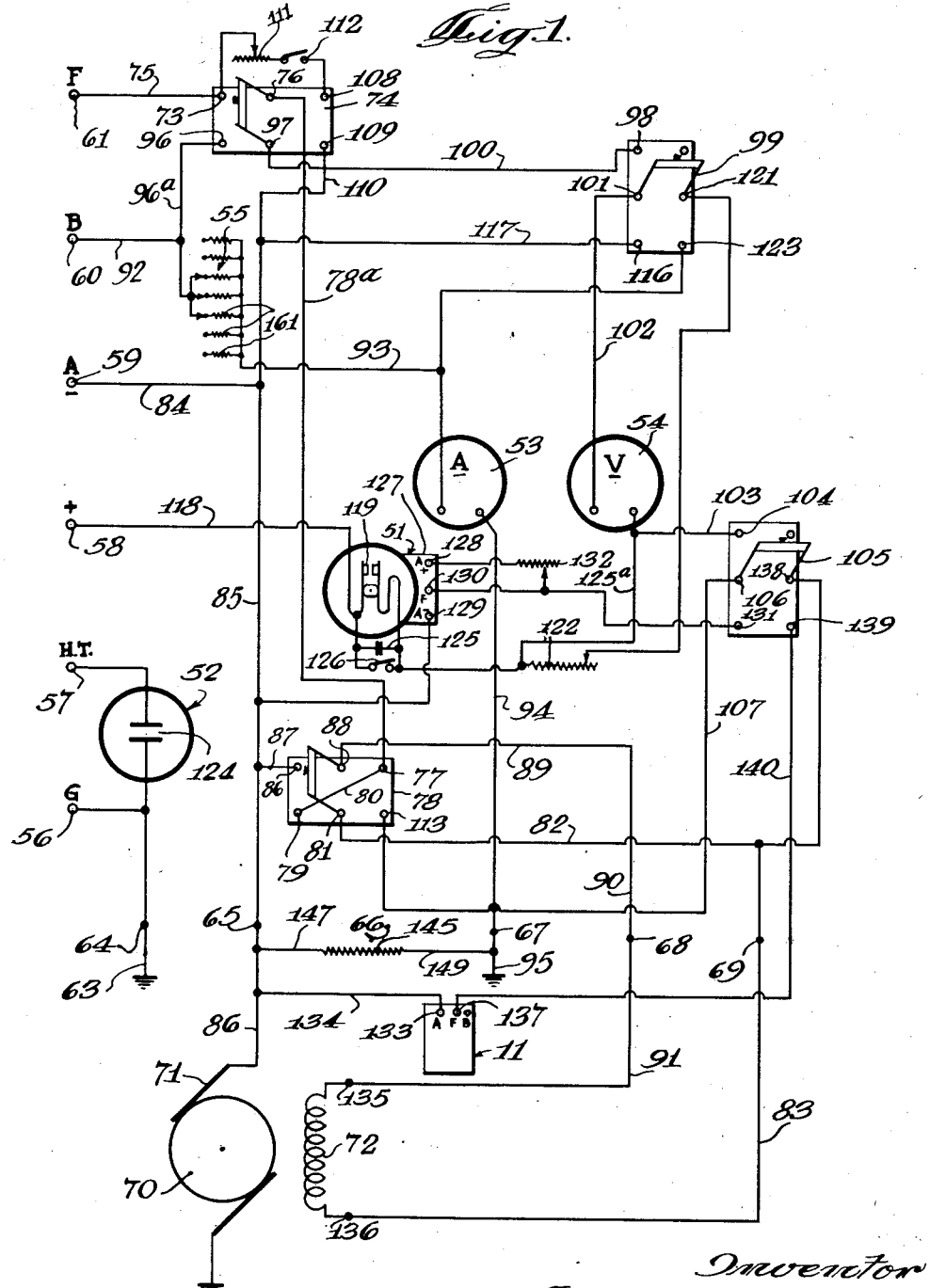

May 12, 1953     R. A. CRUMBLISS     2,638,495
TESTING APPARATUS
Filed April 26, 1951     3 Sheets-Sheet 2
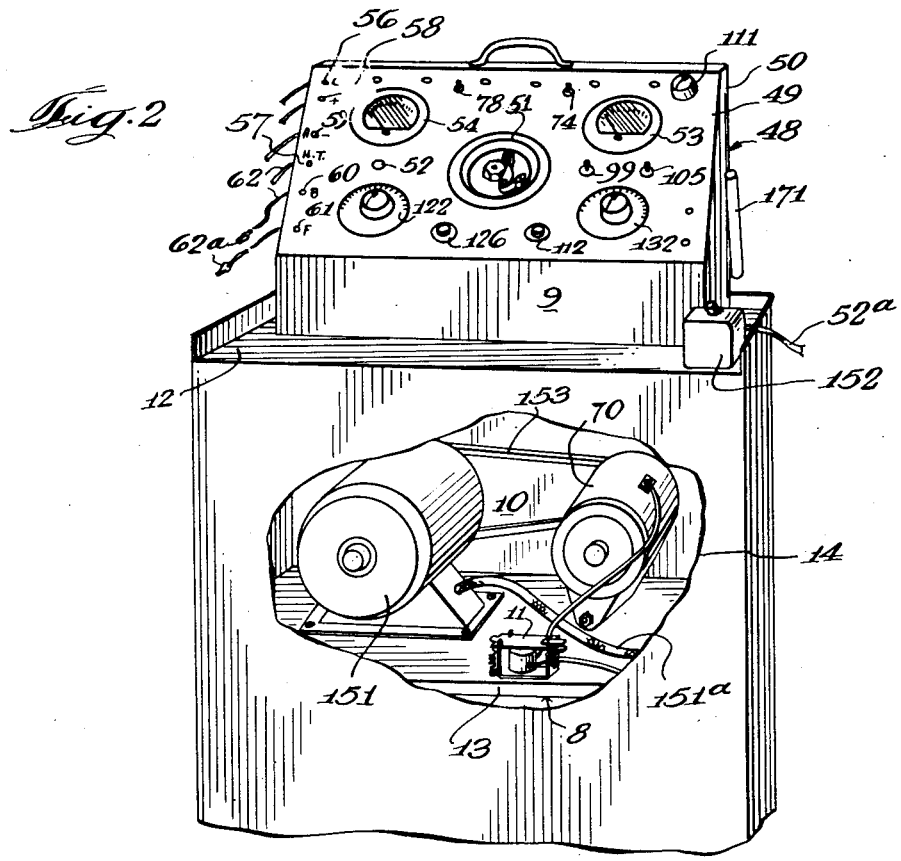
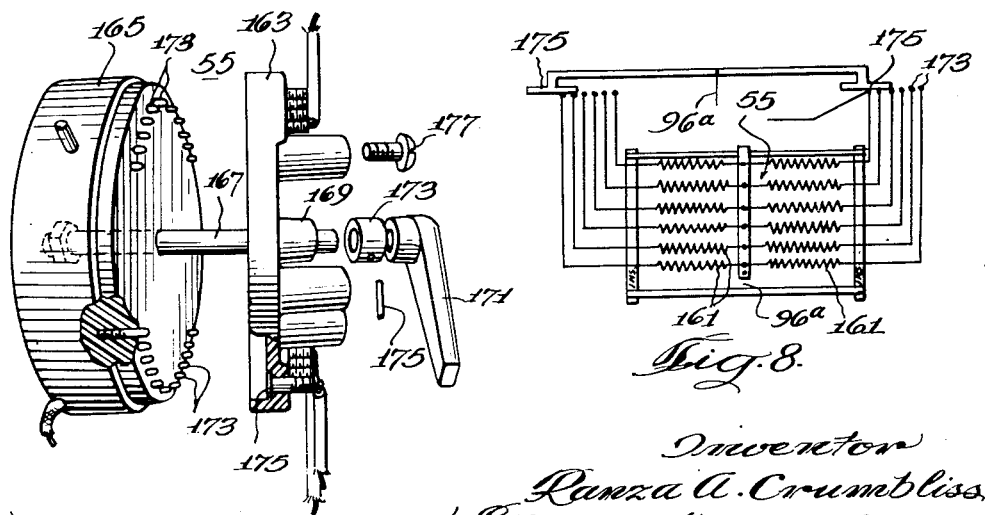

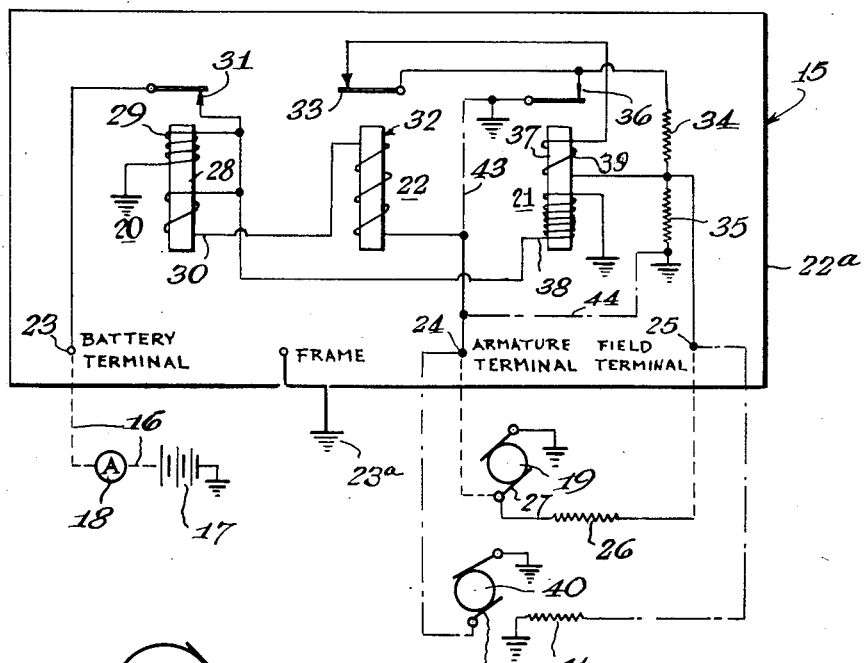

Patented May 12, 1953

2,638,495

UNITED STATES PATENT OFFICE 2,638,495

TESTING APPARATUS

Ranza A. Crumbliss, Chicago, Ill.

Application April 26, 1951, Serial No. 222,969

8 Claims. (Cl. 175—183)

The present invention relates to improved apparatus for ascertaining the operating characteristics of voltage regulators and ignition coils of the type which are most frequently employed in connection with motor vehicles.

As is well known, motor vehicles driven by gasoline engines have electrical systems comprising a generator for providing electrical energy when the engine is operating, a battery which furnishes a source of electrical energy when the generator is not providing sufficient voltage, and a regulator for preventing discharge of the battery through the generator when the voltage of the generator is less than the terminal voltage of the battery. The regulator is also operable to limit the voltage and current output of the generator in order to prevent damage to the electrical devices in the electrical system and the generator.

Conventional regulators comprise three principle circuits; a cut-out circuit for preventing discharge of the battery through the generator, a current regulating circuit which is adapted to limit the current out-put of the generator to a predetermined value, and a voltage regulating circuit for limiting the voltage of the generator. These circuits are usually enclosed in a casing or housing, external terminals being provided for connection to the electrical system of the automobile. Accordingly, in testing the operativeness of the regulator, it is desirable that this may be done without removing the casing and it would be highly advantageous to test the operating characteristics of the various circuits by merely connecting test apparatus to the external terminals. If defective circuits can be discovered in the regulator without removal of the casing, rapid testing and servicing may be effected. However, for most accurate checking of the regulator, it is necessary that it be done independent of the automobile system with which it is normally associated. This independent checking of regulators permits standardization of the tests so that regulators may be accurately tested for compliance with specifications.

The electrical system further comprises an ignition circuit which includes a high tension coil for providing sufficient voltage to cause a spark to jump between the points of the spark plugs associated with the engines. The coil is electrically connected to a circuit breaker mechanism which provides a pulsating current to the coil, the pulsating current having a frequency which is directly proportional to the speed of the automobile engine. However, the coil may have different characteristics at different engine speeds and, therefore, may function satisfactorily when the engine is running at relatively high speeds, but, on the other hand, may be wholly unsatisfactory at low speeds, as when the automobile is being started. In addition, the converse may be true, i. e. the coil may be satisfactory for starting purposes but unsatisfactory when the engine is running at high speeds. Thus, if the coil is to be properly checked, it should be done under conditions simulating operating conditions.

It is, of course, important that the regulator and coil be in good condition for most efficient automobile operation, and various testing devices have been provided in the past for determining the operability of regulators and coils. However, these devices have not all been wholly satisfactory and most of the previously known devices have not tested the characteristics of the regulator or coil but merely ascertained their general operability. Moreover, the heretofore known testing devices, have been, in general, only adapted to determine the operability of portions of the regulator or the coil, or limited to the testing of certain types of regulators. In addition, many of the previously known devices were only operative to test the regulator in conjunction with the whole motor vehicle electrical system and were not adapted to determine the defective sections of the regulator without removal of the casing.

Accordingly, the main objects of the invention are to provide an improved but simple apparatus which is operable for testing voltage regulators and ignition coils; which may be employed for testing all conventional types of regulators; which may be assembled into a compact unit; which is operable to test all the operating characteristics of conventional voltage regulators and ignition coils; which is adapted to locate defective circuits externally of the regulator or coil; which may be employed independent of the electrical system with which the regulator or coil is normally associated; and the provision of improved apparatus of this type which may be easily manufactured and which may be operated with facility and without difficulty.

An illustrative embodiment of the invention is shown in the accompanying drawings, in which—

Fig. 1 is a circuit diagram illustrating a test circuit, in accordance with the invention, for determining the operating characteristics of voltage regulators and ignition coils;

Fig. 2 is a perspective view of the test apparatus, part of the casing being broken away to show a motor-generator set which provides electrical energy for the test apparatus;

Fig. 3 is a circuit diagram of a conventional type voltage regulator;

Figs. 4 and 5 are circuit diagrams of conventional generators;

Fig. 6 is a circuit diagram of an ignition coil;

Fig. 7 is an exploded view of a variable resistance unit; and

Fig. 8 is a schematic view of the resistance unit shown in the previous figure.

Referring more particularly to the drawings, the apparatus of the invention comprises a main frame 8, which is preferably fabricated from suitable angle, channel and plate sections. This frame supports a testing unit 9, a motor-generator set 10 for providing the desired current and voltage to the testing unit 9, and a regulator unit 11, which is operable to limit the voltage of the generator associated with the motor-generator set.

The main frame 8 includes, as shown in the drawings, a table 12 on which is supported the testing unit 9 and a shelf 13 which carries the motor-generator set 10 and the associated regulator unit 11. A casing or housing 14 surrounds the main frame in order to protect the various operative parts of the apparatus and to provide test apparatus of pleasing appearance.

The testing unit 9 carried on the main frame is particularly adapted for determining the operability of either of two types of regulators or ignition coils which are normally employed in automobiles or trucks. However, the apparatus is additionally operable to ascertain the operating characteristics of these regulators and coils under conditions which simulate the use to which they are subjected.

Before considering the testing unit 9 in greater detail, the operation and electrical arrangement of the two types of regulators and the coils, with which the apparatus is particularly adapted to be used, should be considered. These regulators and coils are commercially available and their operation and construction well known to those familiar with the art.

One type of voltage regulator 15 is shown diagrammatically, in Figure 3 of the drawings (in solid lines), the regulator being shown connected by dotted lines 16 to a battery 17 through an ammeter 18 and to a generator 19. This regulator basically comprises a cut-out circuit 20, a voltage regulating circuit 21, and a current regulating circuit 22, these circuits being mounted on a frame 22a; and usually enclosed in a housing or casing (not shown) which is grounded as shown at 23a, and which normally prevents access to the circuits. The circuits 20, 21 and 22 are electrically connected to a battery terminal 23, armature terminal 24, field terminal 25 and to the frame 22a. The battery terminal 23 is connected to the battery 17, the field terminal 25 and armature terminal 24 being connected to the field 26 and armature 27, respectively, of the generator 19.

The cut-out circuit 20 is adapted to disconnect the battery 17 from the generator 19 when the voltage of the generator goes below a predetermined value, and to connect the generator to the battery when the generator voltage exceeds this value. Accordingly, the cut-out circuit 20 includes a solenoid 28 comprising an actuating coil 29 and a compensating coil 30, the solenoid co-acting with contacts 31 which open when the generator voltage is below the predetermined voltage.

The current regulator circuit 22 also includes a solenoid 32 which cooperates with a set of contacts 33 to vary the resistance in the field 26 of the generator 19 and thereby limit the current out-put of the generator to a predetermined value, usually about 36 amps. Opening of the contacts 33 is operable to place resistances 34 and 35, in parallel, in the field circuit of the generator 19, as will appear more clearly hereinafter.

The voltage regulator circuit 21 includes contacts 36 which are opened by a solenoid 37 comprising a voltage responsive actuating coil 38 and a compensating coil 39, the solenoid 37 being operable to open and close the contacts 36 in such a manner that the voltage of the generator is limited to a desired value, normally between 7.2 and 7.4 volts. Opening of the contacts 36 causes the resistance 35 to be placed in the field circuit of the generator.

The contacts 33 and 36 associated with the current and voltage regulating circuits 21 and 22 open and close to vary the resistance in the field circuit 26 of the generator 19 and commence operating at a voltage and a current below the predetermined limits. For example, the contacts 33 associated with the current regulator circuit 22 may commence opening at 35 amps, and the contacts employed with the voltage regulating circuit may begin opening at 6.0 volts so that the voltage and current are gradually limited. It is important that this characteristic be checked in order to determine the efficiency of the regulator.

The various circuits 20, 21 and 22 are interconnected as follows: The current regulator solenoid 32 is connected to the armature terminal 24 and to the battery 17 through the compensating coil 30, the contacts 31 of the cut-out circuit 20, and the ammeter 18. The solenoid 32 also connects to the voltage responsive actuating coil 29 of the cut-out solenoid 28, the actutaing coil being grounded to the frame 22a of the regulator 15. The compensating coil 30 connects to the voltage responsive coil 38 of the voltage regulating circuit 21, the latter coil being grounded to the frame 22a of the regulator 15. The compensating coil 39 of the voltage regulating circuit 21 is connected to the field terminal 25 and to ground through the contacts 33 and 36 associated with the current regulating and voltage regulating circuits, 22 and 21. The field terminal 25 is also connected to resistances 34 and 35, the resistance 35 being grounded to the frame 22a of the regulator 15, and resistance 34 being grounded to the regulator unit through the contacts 36 associated with the voltage regulating circuit 21.

In operation, when the generator voltage exceeds the predetermined voltage required to overcome the voltage of the battery, contacts 31 close thereby connecting the armature 27 to the battery 17. When the current drawn from the generator exceeds a selected value, less than the predetermined limit of current out-put, contacts 33 of the current regulating circuit open thereby placing resistances 34 and 35, in parallel, in the field circuit 26 of the generator 19 and reducing the current output. On the other hand, when the voltage exceeds a selected value, less than the maximum voltage permitted by the regulator 15, the contacts 36 of the voltage regulating circuit are opened thereby placing resistance 35 in the field circuit 26 of the generator 19 and limiting its voltage.

A different type generator 40 is shown in Fig. 5 from that previously discussed and shown in Figs. 3 and 4. In this type of generator, the field 41 is grounded directly at one end, and the regulator which is used with such generators and which is designated 15a is connected intermediate the ungrounded side of the field 41 and the generator armature 42. In such systems, the regulator 15a is connected as shown by dot-dash lines in Fig. 3. More particularly, the contacts 36 are connected to the generator armature 42 as illustrated at 43, instead of ground, and resistance 35 is also connected to the armature 42 as shown by dot-dash line 44 in place of ground. Nevertheless, the over-all operation of the regulator is the same as described above, the resistances 34 and 35 merely being inserted at different points in the field circuits 26, 41.

The ignition coils 45 for which the test apparatus is adapted is shown schematically in Fig. 6. These coils comprise a primary coil 46 and a secondary coil 47 which is usually wound on a tube (not shown) which surrounds the primary coil 46. In operation, the pulsating current in the primary coil is induced into the secondary coil which comprises many more windings than the primary and consequently produces a high voltage for the spark plugs.

The testing unit 9 is particularly adapted to test the complete operational characteristics of the above described types of regulators and ignition coils. The testing unit 9 includes a frame 48 on which is mounted a panel board 49 and around which is disposed a casing 50 to protect the various parts of the unit 9. The frame 48 mounts various circuit elements, the circuit being shown schematically in Fig. 1 of the drawings. Basically the circuit comprises a circuit breaker unit 51 for supplying a pulsating current to the ignition coil 45 being tested, an indicating means 52 for ascertaining the operability of a coil 45 under test, an ammeter 53, a voltmeter 54, and resistances 55 for varying the current which is supplied to a regulator under test. These various elements are associated with various switches and other elements to be hereinafter described to provide a simple and compact unit for servicing voltage regulators and ignition coils.

The testing unit 9 is provided with six terminals 56, 57, 58, 59, 60, and 61 which are connected to leads 62, each provided with a suitable clamp 62a for easy connection to the accessory to be tested.

As has been before pointed out, the testing apparatus is adapted to check either of the two types of regulator units, 15 and 15a, without obtaining access to the circuits in the regulator unit. This may be done by merely connecting the field battery, and armature terminals, 23, 24 and 25, of the regulator unit, 15 or 15a, to terminals 61, 60 and 59 of the testing unit 9 through leads 62. The frame 23 of the regulator unit should be grounded to the regulator unit 15 or 15a by connecting a lead 62 to terminal 56, this terminal being grounded to the frame 48 of the testing unit as shown at 63.

The testing unit 9 is also provided with six additional terminals 64, 65, 66, 67, 68 and 69 which are employed for connecting the testing unit to the generator 70 of the motor-generator set 10. During testing of regulators, 15 or 15a, the regulator under test is connected to the armature 71 and field 72 of this generator 70 through the testing unit 9. The generator 70 and testing unit coact to provide variable voltages and currents to the regulator under test so as to determine its operating characteristics under conditions simulating those in the electrical system of the motor vehicle with which it is normally used.

Terminal 61, which is connected to the field terminal 25 of the voltage regulator unit, is connected to the field 72 of generator 70 through the testing unit 9. More particularly, terminal 61 is in conductive relation with a post 73 of a double-pole-double-throw switch 74 through a conductor 75. Post 73 is electrically connected to pole 76 of the switch when the switch is closed in one position, the pole 76 being connected to a post 77 of another double-pole-double-throw switch 78 by means of conductor 78a. Post 77 is connected to post 79 of the switch 78 by a jumper lead 80, the post 79 being connected to a pole 81 when the switch is closed in one position. Pole 81 is electrically connected to terminal 69 of the testing unit 9 through conductor 82. Conductor 83 connects this terminal 69 to the field 72 of the generator 70.

The terminal 59 of the testing unit 9, which is connected to the armature terminal 24 of the regulator 15, is electrically connected to the armature 71 of the generator 70 of the motor-generator set 10. This is accomplished by connecting terminal 59 directly to terminal 65 of the testing unit 9 through conductors 84 and 85, the terminal 65 being connected to the armature 71 of the generator 70 associated with the motor-generator set through conductor 86. In order to connect the armature 71 of the generator to the field 72, terminal 59 also connects to a post 86 of the switch 78 through conductors 84, 85 and 87. Post 86 is connected to a second pole 88 of the double-pole-double-throw switch 78 when the switch is closed in one position, pole 88 being connected to terminal 68 of the testing unit 9 through leads 89 and 90. Terminal 68 connects to the field of the generator 70 associated with the motor-generator set 10 through lead 91. As a result, the armature 71 of the generator 70 is in conductive relation with the field 72.

The terminal 60 of the testing unit 9, which is connected to the battery terminal 23 of the regulator unit, 15 or 15a, is connected to ground through the variable resistance 55 and the ammeter 53. Conductor 92 is employed for connecting terminal 60 to the variable resistance 55 and conductor 93 connects the resistance 55 to the ammeter 53. The ammeter is connected to terminal 67 of the testing unit 9 through conductor 94, the terminal 67 being grounded as shown at 95.

When the voltage regulating and current regulating circuits, 21 and 22, of the regulator, 15 or 15a, are being tested, the voltage is measured at the terminal 60. This measurement is accomplished by effectively connecting the voltmeter 54 between the terminal 60 and ground. For purposes of this voltage measurement, terminal 60 is connected to a post 96 of the switch 74 through conductors 92 and 96a. The post 96 is electrically connected to a pole 97 of the switch when the switch is closed in one position, this pole being connected to a post 98 of a double-pole-double-throw switch 99 through conductor 100. The post 98 is connected to the voltmeter 54 when the switch 99 is in a position to connect the post 98 to a pole of the switch 101 and conductor 102. The voltmeter 54 is grounded to a terminal 67 of the testing unit 9 through conductor 103 and post 104 of another double-pole-double-throw switch 105. The post 104 is in conductive relation with a pole 106 of the switch 105 when the switch is in one position, and the pole is connected to terminal 67 and ground through lead 107.

The foregoing connections provide for testing the voltage regulating and current regulating circuits of the regulator 15, as will appear more clearly hereinafter. The characteristics of these circuits are ascertained by varying the resistance 55 to lower and raise the voltage applied to the regulator and to adjust the current flow through the regulator 15 or 15a.

In order to ascertain the characteristics of the cut-out circuit 20 of the regulator, 15 or 15a, the double-pole-double-throw switch 74, which will be sometimes referred to as the cut-out test switch, is thrown so as to connect poles 76 and 97 to posts 108 and 109, respectively. As a result of this switch, pole 97 is connected to the armature of the generator 70 through post 109 and conductors 110 and 85. The armature voltage of generator 70 may be read from the voltmeter 54.

When the cut-out test switch 74 is thrown, a rheostat 111 is inserted between the terminal 61, which connects to the field terminal 25 of the regulator 15 or 15a, and the field 72 of the generator 70 associated with the testing unit 9. Adjustment of the rheostat varies the voltage applied to the cut-out circuit 20 of the regulator. Considering the connections more particularly, pole 76 of the cut-out test switch is connected to post 108 when the switch is thrown, and this post is connected to the terminal 61 of the testing unit 9 through the rheostat 111, post 73 and conductor 75. A single-pole-single-throw reset switch 112 of the push-button type may be inserted in the circuit intermediate the rheostat 111 and switch 74 for facilitating accurate checking of the cut-out circuit as will be made clear hereinafter. The pole 76 is connected to the field 72 of the generator, as explained hereinbefore.

When it is desired to ascertain the characteristics of the regulator 15a, double-pole-double-throw switch 78, which will sometimes be referred to as the alternate regulator test switch, is thrown so as to connect pole 88 with post 77 and pole 81 with another post 113. As a result, pole 81 is grounded through post 113 and lead 114 to terminal 67. In addition, pole 88 is connected to pole 76 of the cut-out test switch 74 through lead 78a for the test of the various circuits of the regulator 15a. The effect of throwing switch 78 is to place the regulator 15a intermediate the armature 71 and field 72 of the generator 70 and to ground one side of the field 72.

For testing the ignition coil 45, terminals 57, 58 and 59 of the testing unit 9 are employed. When this test is carried out, a high tension wire 115 (Fig. 6), which is usually associated with the coil is connected to terminal 57, the primary coil 46 connected to terminal 59 and one end of each of the coils 46 and 47 is connected to terminal 58. Terminal 59 is connected to the armature 71 of the generator 70, as before pointed out.

Terminal 58, which is connected to the primary coil 46 of the coil 45, connects to the circuit breaker unit 51 through conductor 118. This circuit breaker unit 51 comprises a pair of contacts 119 which are opened and closed by means of a cam 120. One of the contacts 119 is connected to the conductor 118, the other of the contacts being connected to a pole 121 on coil test switch 99 through a variable resistance 122. Pole 121 is electrically connected to a post 123 which post is connected to the ammeter 53. The ammeter is connected to ground through terminal 67 and lead 94, as before described.

Terminal 57, which is connected to the high tension wire of the coil 45, is connected to ground through terminal 64. The indicating means 52 is disposed in this circuit so that the operation of the coil 45 may be ascertained. In the illustrated embodiment, the indicating means comprises a glass bulb having a spark gap 124 disposed therein.

In order to prevent undue sparking between the contacts 119, a condenser 125 is effectively placed across the contacts. More particularly, a condenser 125 is connected to lead 118 which is attached to terminal 58. The condenser 125 is also connected to one side of the variable resistance 122.

For purposes of ascertaining the voltage between the terminals 58 and 59 of the testing unit 9, the voltmeter 54 is effectively placed across these terminals, 58 and 59, thereby measuring the voltage across the primary coil 46 of the ignition coil 45. The voltmeter 54 is connected to the ungrounded side of the resistance 122 through conductor 125a and to the armature 71 of the generator 70 as hereinbefore pointed out. In order to obtain an accurate reading of the voltage at the terminal 58, a shorting switch 126 is effectively placed across the contacts 119, thereby shorting out these contacts when desired. The shorting switch 126 may be of the single-pole-single-throw, push-button type so that the switch may be depressed temporarily and an accurate voltage read.

A motor 127 is associated with the circuit breaker unit 51. This motor is connected to the cam 120 in any usual manner. The motor is preferably of the type which may be energized by the generator 70 but, of course, other types of motors may be employed. The motor shown in the drawings is provided with a pair of armature terminals 128 and 129 and a field terminal 130. The field associated with terminal 130 is connected to armature terminal 129 within the motor, the field terminal being grounded through connection to a post 131 on switch 105. This post is connected to a pole 106 on the switch and to ground through the conductor 107. In order to vary the speed of the motor 127, a rheostat 132 is placed between terminal 128 and ground, the rheostat being connected to ground through post 131, switch 105 and conductor 107. Through control of the rheostat 132 the motor may be varied between a low speed which simulates an engine when it is being started and a high speed which is equivalent to any speed at which an automobile is driven.

When ignition coils are being tested it is highly desirable to maintain the voltage of the generator 70 as near constant as possible in order to assure constant speed of the motor 127 associated with the circuit breaker unit 51 and to provide most accurate checking of the ignition coil 45. Accordingly, the regulator 11 associated with the motor-generator set 10 is connected to the generator 70 when an ignition coil is being tested. This regulator is of conventional construction having current regulating and voltage regulating circuits like circuits 21 and 22 of regulator 15. During coil tests, the armature terminal 133 of the regulator 11 is connected to the armature 71 of the generator 70 through conductor 134. One side 135 of the field 72 of the generator 70 is connected to the armature 71 of the generator through switch 78 as hereinbefore described. The other side 136 of the field 72 is connected to the field terminal 137 of the regulator 11. This latter connection is accomplished by connecting this side 136 of the field to terminal 69 through conductor 83. The terminal 69 being connected to a pole 138 on switch 105. This pole 138 is connected to a post 139 of the switch 105, to the post connecting to the field terminal 137 of the regulator 11 through lead 140. As a result, the voltage and current of the generator 70 are regulated.

In order to always provide a load for the generator 70 so as to prevent possible damage thereto a resistance 145 is connected between the generator armature 71 and ground. The resistance is connected to the armature through conductors 147 and 86 and to ground through conductor 149. The resistance is of low value, usually about one ohm, and high capacity.

The generator 70 of the motor-generator set 10 is connected to a motor 151 which is usually of the 60 cycle, 110 volt type so as to be operable from most readily available power supplies. The motor 151 is carried on the shelf 13 of the frame 8 and is connected to the generator by means of a belt 153. The motor 151 and generator 70 are each provided with pulleys (not shown) which engage the belt 153. The motor is connected to an on-off switch 152 through lead 151a, the on-off switch being connected to a source of power through a cord 152a.

The various circuit elements, as for example the switches, are of commercially available, heavy-duty types. However, the ammeter 53 may be of the multi-scale type for obtaining more accurate readings. For this purpose, the ammeter may be provided with a switch (not shown) to permit switching between scales or it may be wired in a different manner so as to automatically provide a reading on the desired scale.

The resistance 55 is of special construction (Fig. 7) and is adapted to place various resistances 161 in parallel to vary the circuit resistance. The resistance 55 comprises, in addition to resistances 161, a cup-shaped base 163 made of an insulating material, such as Bakelite, and an underlying, cylindrical rotatable member 165 adapted to fit into the base 163. The rotatable member 165 is made of conducting material and a shaft 167 is in fixed relation therewith. The shaft 167 extends through bearing 169 which is an integral part of the base 163. A manually operable handle 171 is connected to the shaft 167 and a collar 173 is secured to the shaft by a pin 175 between the handle 171 and bearing 169.

The resistance is secured to the casing 50 which surrounds the test unit 9 and for this purpose screws, such as screw 177, are provided, the screw 177 being adapted to engage threaded apertures formed in the base 163.

From the foregoing, it will be apparent that the rotatable member 165, turns relative to the base 163 by movement of the handle 171. This movement is adapted to vary the resistance in the circuit. For this purpose, the rotatable member 165 carries the resistances 161 (Fig. 8), the resistances being connected to spring pressed pins 173. These pins 176 engage plates 175 on the base 163. The plates 175 are in conductive relation with conductor 96a. Briefly, rotation of the handle 171 varies the number of resistances 161 in the circuit and as these resistances are effectively in parallel, and increase of the number of resistances in the circuit lowers the resistance of the circuit.

Regulator test

To test both types of regulators, i. e., 15 or 15a, the field terminal 25, armature terminal 24, and battery terminal 23 of the regulator are connected to terminals 61, 59, and 60, respectively, of the testing unit 9 through leads 62. A lead 62 is also connected to the frame of the regulator, 15 or 15a, and to terminal 56 of the testing unit 9.

Depending upon the type of regulator, 15 or 15a, being tested, alternate regulator test switch 78 is thrown for the desired test. In the following, it will be assumed that a regulator of the type designated by the numeral 15 is being tested but it should be understood that all of the tests are identical for regulators of the type designated by 15a by mere actuation of the switch 78.

In order to make regulator tests, switches 99 and 105 are thrown to the regulator test position, switch 99 making the circuit breaker unit 51 inoperative and readying the voltmeter 54 for the various tests, and switch 105 disabling the regulator 11 of the motor-generator set 10 and connecting the voltmeter 54 to ground. In addition, resistance 55 is preferably set at its position of maximum resistance.

The cut-out test switch 74 is thrown so as to connect its poles 76 and 97, to posts 108 and 109 for purposes of making the cut-out test. The rheostat 111 is adjusted thereby varying the resistance in the field circuit 72 of the generator 70 and, consequently, the voltage of the generator 70. Reset switch 112 is then depressed permitting the generator voltage to gradually build up. Voltmeter 54 and ammeter 53 are scanned by the operator to ascertain the precise point of closure of the contacts 31 of the regulator 15. The reset switch 112 may be released and again depressed until the exact point of operation is ascertained. In this connection, when the contacts 31 of the regulator, 15 or 15a, close, the ammeter 53 will commence indicating current flow when the contacts 31 close.

After the cut-out test, cut-out test switch 74 is thrown so as to connect its poles 76 and 97 to posts 73 and 96, respectively, of the switch. As a result, there is no resistance in the field 72 of the generator 70 and its maximum voltage and current output may be utilized.

The voltage applied to the regulator voltage regulating circuit 21 is varied by adjustment of resistance 55 and the operational characteristics of this circuit may be determined from the voltmeter 54 and ammeter 53. By adjusting resistance 55 to a very low resistance the operational characteristics of the current regulating circuit 22 may be determined from the ammeter 53 and voltmeter 54.

These tests may be easily, simply, and quickly carried out and provide complete information on the characteristics of the regulator, 15 or 15a, under test. The unit has found substantial utility in testing units from assembly line production in addition to every-day automobile servicing.

Coil test

In testing coils 45, the high tension wire 115 is connected to terminal 57 and the primary coil to terminal 58 by means of a lead 62. The primary and secondary coils, 46 and 47, are also connected to terminal 59 by means of a lead 62. Switch 105 is thrown to connect the generator 70 to the regulator unit 11 to control the generator voltage, and coil test switch 99 is thrown so as to permit proper voltage readings and operation of the circuit breaker unit 51. The rheostat 132 is adjusted to an intermediate point and the operability of the coil is ascertained by visual indication of the indicating means 52. The voltage across the primary is accurately read by depressing switch 126. This voltage may be adjusted by control of rheostat 122.

Low and high motor speeds may be simulated by adjustment of rheostat 132 so as to ascertain the operability of the coil under all road conditions. The ammeter 53 will give a reading of the current drawn during the test so as to give an even more accurate check of coil efficiency.

In the foregoing, I have described an improved test unit for easily and simply testing both coils and voltage regulators. The testing circuits are interrelated and coact with one another to provide a compact, easily assembleable unit. The testing apparatus provides complete operational information without difficulty in minimum time and is ideal for both servicing and testing assembly line units in addition to servicing automobiles and trucks.

The various features of the invention which are believed new are set forth in the following claims.

I claim:

1. Apparatus for testing conventional regulators having an armature terminal, a field terminal and a battery terminal, and ignition coils having a high tension lead and a pair of low voltage terminals, comprising in combination a generator adapted to supply variable currents and voltages and having an armature and a field, means for connecting said field alternatively to the armature terminal of the regulator and to a low voltage terminal of the coil, circuit breaking means adapted for connection to the other terminal of the coil, variable impedance means connected intermediate said circuit breaking means and ground, indicating means adapted for connection to the high tension lead and to ground to thereby determine the operability of the coil, a variable resistance adapted for connection to the battery terminal of the regulator and to ground, a second variable resistance adapted for connection to the field terminal of the regulator, and means for alternatively connecting said second variable resistance to ground through the field of said generator and to said generator armature through the field of said generator thereby to test alternate types of regulators.

2. Apparatus for testing conventional regulators having an armature terminal, a field terminal and a battery terminal, and ignition coils having a high tension lead and a pair of low voltage terminals, comprising in combination a generator adapted to supply variable currents and voltages and having an armature and a field, means for connecting said field alternatively to the armature terminal of the regulator and to a low voltage terminal of the coil, circuit breaking means adapted for connection to the other terminal of the coil, means for varying the rate of operation of said circuit breaking means to thereby vary the frequency of application of electrical energy to the coil, variable impedance means connected intermediate said circuit breaking means and ground, indicating means adapted for connection to the high tension lead and to ground to thereby determine the operability of the coil, a variable resistance adapted for connection to the battery terminal of the regulator and to ground, a second variable resistance adapted for connection to the field terminal of the regulator, and means for alternatively connecting said second variable resistance to ground through the field of said generator and to said generator armature through the field of said generator thereby to test alternate types of regulators.

3. Apparatus for testing conventional regulators having an armature terminal, a field terminal and a battery terminal, and ignition coils having a high tension lead and a pair of low voltage terminals, comprising in combination a generator adapted to supply variable currents and voltages and having an armature and a field, means for connecting said field alternatively to the armature terminal of the regulator and to a low voltage terminal of the coil, a voltmeter, an ammeter, circuit breaking means adapted for connection to the other terminal of the coil, means for connecting said voltmeter intermediate said circuit breaking means and said generator armature, variable impedance means connected to said circuit breaking means, means for connecting said variable impedance to said ammeter and to ground, indicating means adapted for connection to the high tension lead and to ground to thereby determine the operability of the coil at selected currents and voltages, a variable resistance adapted for connection to the battery terminal and connected to said ammeter, means for connecting said resistance to said voltmeter, a second variable resistance adapted for connection to the field terminal of the regulator, means for alternately connecting said second variable resistance to ground and to said generator armature through said generator field to thereby test alternate types of regulators.

4. Apparatus for determining the operating characteristics of conventional regulators for motor vehicles having an armature terminal, a battery terminal and a field terminal comprising in combination a generator having an armature and a field, a variable resistance connected to the battery terminal and to ground, means for connecting said generator armature to the armature terminal, a second variable resistance adapted for connection to the field terminal, and means for alternately connecting the field terminal to said generator armature and ground through said generator field whereby two types of regulators may be alternately tested by said apparatus, said alternate connecting means being adapted for connection to said second variable resistance to place said second resistance in series with said field terminal.

5. Apparatus for determining the operating characteristics of conventional regulators for motor vehicles having an armature terminal, a battery terminal and a field terminal comprising in combination a generator having an armature and a field, a variable resistance connected to the battery terminal and to ground, means for connecting said generator armature to the armature terminal, a second variable resistance adapted for connection to the field terminal, means for alternately connecting the field terminal to said generator armature and ground through said generator field, and switching means for connecting said alternate connecting means directly to the field terminal and to said second variable resistance to thereby place said second resistance in series with said field terminal.

6. Apparatus for determining the operating characteristics of conventional regulators for motor vehicles, the regulators having a battery terminal, a field terminal, and an armature terminal, comprising in combination a generator having an armature and a field, means for connecting said generator armature to the armature terminal of the regulator, a low resistance, high wattage resistance connected between said generator armature and ground, a variable resistance adapted for connection to the battery terminal, an ammeter connected between said variable resistance and gorund, a second variable resistance adapted to connect to the field terminal, switching means for alternately connecting the field terminal to ground through said generator field and to said generator armature through said generator field, said switching means including a double pole, double throw switch having a pair of poles and two pairs of posts, one post of one pair being adapted for connection to the field terminal, the other post of said one pair being grounded, one post of the second pair of posts being connected to said generator armature, the other post of said second pair being in conductive relation with said one post of said first pair, one pole of said pair being adapted to be in conductive relation with the one post of each pair of posts connected to said generator field, the other pole being connected to the opposite side of the generator field, means for alternately connecting the field terminal directly to said switching means and to said second variable resistance, a voltmeter, and means for alternately connecting said voltmeter to the battery terminal and to said generator.

7. Apparatus for determining the operating characteristics of conventional regulators for motor vehicles, the regulators having a battery terminal, a field terminal, and an armature terminal, comprising in combination a generator having an armature terminal, comprising in combination a generator having an armature and a field, means for connecting said generator armature to the armature terminal for the regulator, a low resistance, high wattage resistance connected between said generator armature and ground, a variable resistance adapted for connection to the battery terminal, an ammeter connecter to said variable resistance and ground, a second variable resistance adapted to connect to the field terminal, switching means for alternately connecting the field terminal to ground through said generator field and to said generator armature through said generator field, said switching means including a double pole, double throw switch having a pair of poles and two pairs of posts, one post of one pair being adapted for connection to the field terminal, the other post of said one pair being grounded, one post of the second pair of posts being connected to said generator armature, the other post of said second pair being in conductive relation with said one post of said first pair, one pole, of said pair being adapted to be in conductive relation with the one post of each pair of posts connected to said generator field, the other pole being connected to the opposite side of the generator field, means for alternately connecting the field terminal directly to said switching means and to said second variable resistance, said last mentioned means comprising a double throw switch having one post connected to the field terminal and to one end of said second variable resistance, a second post connected to the other end of said second resistance and a pole connected to said switching means, a voltmeter, and switch beans for alternately connecting said voltmeter to the battery terminal and to said generator armature.

8. Apparatus for testing the operating characteristics of ignition coils for motor vehicles having a high voltage lead and a pair of low voltage connections, comprising in combination a source of substantially constant voltage, means for connecting said source to one of the connections, circuit breaking means having a pair of opening and closing contacts, means for opening and closing said contacts at varying rates, means for connecting said circuit breaking means to the other of the low voltage connections, a short circuit switch connected across said contacts, a variable resistance connected between said circuit breaking means and ground, and indicating means adapted for connection to the high tension lead and connected to ground, whereby ignition coils may be checked at varying voltages and equivalent motor vehicle speeds.

RANZA A. CRUMBLISS.

References Cited in the file of this patent

UNITED STATES PATENTS

| Number | Name | Date |
|---|---|---|
| 2,096,131 | Oestermeyer | Oct. 19, 1937 |
| 2,508,367 | Bloom | May 23, 1950 |